United States Patent [19]

Wood

[11] Patent Number: 5,709,435

[45] Date of Patent: Jan. 20, 1998

[54] TOWED VEHICLE BRAKE CONTROL SYSTEM

[75] Inventor: Coleman W. Wood, Pearland, Tex.

[73] Assignee: Ted Ruppel, Pearland, Tex.

[21] Appl. No.: 661,585

[22] Filed: Jun. 7, 1996

[51] Int. Cl.⁶ ........................................ B60T 13/68
[52] U.S. Cl. ........................ 303/7; 188/3 H; 303/15
[58] Field of Search ...................... 303/7, 15, 20, 303/8, 123, 124, DIG. 3, 48, 49, 3, 155, DIG. 1, DIG. 2; 188/3 R, 3 H, 1.11 E, 112 R, 112 A

[56] References Cited

U.S. PATENT DOCUMENTS

| | | | |
|---|---|---|---|
| 3,034,598 | 5/1962 | Lafaye | 188/3 R |
| 3,350,142 | 10/1967 | Schuman | 303/7 |
| 3,574,414 | 4/1971 | Jacob | 303/7 |
| 3,768,870 | 10/1973 | Howard | 188/3 R |
| 3,771,838 | 11/1973 | Rossigno et al. | 303/7 |
| 3,790,807 | 2/1974 | Rossigno | 303/7 |
| 3,856,362 | 12/1974 | Howard | 303/7 |
| 3,887,238 | 6/1975 | Bennett | 303/7 |
| 4,099,790 | 7/1978 | Hipps | 303/7 |
| 4,398,771 | 8/1983 | McCurry et al. | 188/3 R |
| 4,635,758 | 1/1987 | Beard, Jr. | 303/49 |
| 4,749,238 | 6/1988 | Singleton et al. | 303/7 |
| 4,756,390 | 7/1988 | Meadows | 303/49 |
| 5,002,343 | 3/1991 | Brearley et al. | 303/7 |
| 5,039,173 | 8/1991 | Emig et al. | 303/7 |
| 5,411,321 | 5/1995 | Harness | 188/3 H |
| 5,503,468 | 4/1996 | Saffran | 303/7 |

*Primary Examiner*—Douglas C. Butler
*Attorney, Agent, or Firm*—Gunn & Associates

[57] ABSTRACT

The present disclosure is directed to a towed vehicle brake system and more particularly to a brake control system which slaves the towed vehicle to the towing vehicle. The system is preferably utilized with existing hydraulic braking systems of the towing and towed vehicles, although the concepts of the disclosure can be adapted to other types of braking systems. The system is easily mounted and removed from both the towing and towed vehicles. When utilized with hydraulic braking systems, the existing hydraulic systems are not penetrated by the disclosed system.

27 Claims, 2 Drawing Sheets

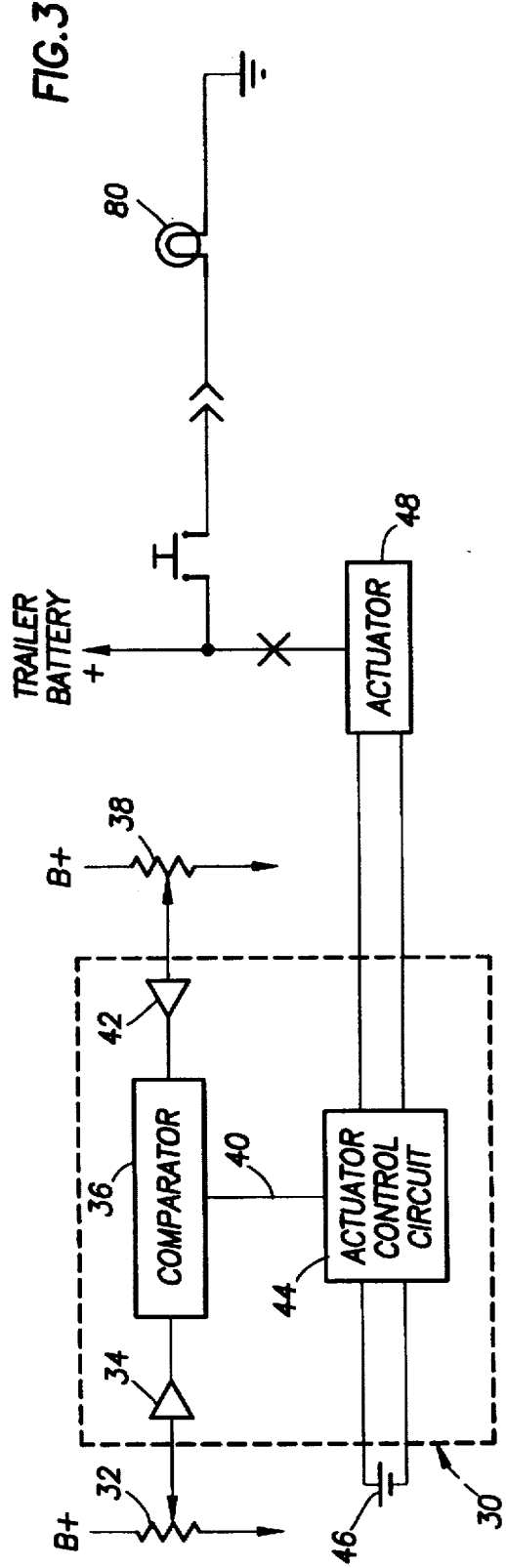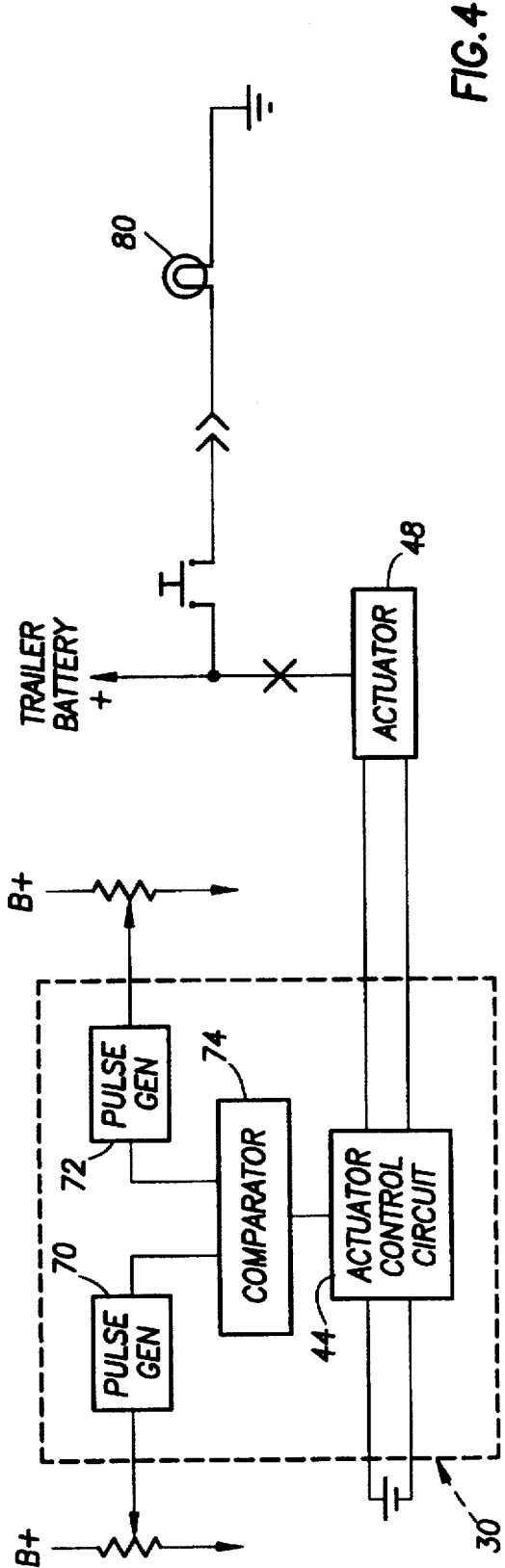

TOWED VEHICLE BRAKE CONTROL SYSTEM

BACKGROUND OF THE DISCLOSURE

The present disclosure is directed to a towed vehicle brake system and more particularly to a brake control system which slaves the towed vehicle to the towing vehicle. To identify the situation, consider a large recreation vehicle (RV hereinafter) which is traveling leisurely from coast to coast. Sometimes, the driver will tow a small car behind the RV. Such small cars typically weigh in the range of about 2,000 pounds and are not large luxury cars but they are convenience vehicles so that the RV can be parked, and local transportation will still be available. In the United States, it is not uncommon for older or retired people who live far north to leave near Thanksgiving to spend the winter in southern climates to escape the heavy winter storms, snow and cold temperatures. Typically, this will involve a trip of at least 800 miles. It is not uncommon for people to travel from the northern states of the United States to spend the winter in warmer climates. Another typical situation involves traveling or touring by retired people who will drive a large pickup truck pulling a trailer sufficiently large to live in, typically mounted on a gooseneck connected to a fifth wheel mounted in the center of the pickup bed. In both instances, the front vehicle tows the rear vehicle which may be very substantial in weight.

The present disclosure is directed to the situation where the towed vehicle is sufficiently large or heavy that it requires its own braking system. This would therefore exempt very small trailers which have a weight of just a few hundred pounds and encompasses every type of towed vehicle and is therefore defined for purposes of this disclosure as a towed vehicle having sufficient weight to require its own braking system. For purposes of this disclosure, the towed vehicle will be identified as a trailer although it can actually be another automobile, pickup truck or other independently operable powered vehicle. This also includes cargo trailers, i.e., trailers without a power plant. The towing vehicle can typically be a utility type van, pickup truck, large automobile, RV, or a more traditional tractor rig. For purposes of this disclosure, that will be globally denoted as a tractor, again noting that this can actually be a passenger car, RV or other passenger carrying vehicle. The driver is located in the tractor and is provided with the usual tractor controls for the trip.

The tractor is constructed with four or more wheels which are almost universally provided with a hydraulic braking system. The hydraulic braking system is constructed with a master cylinder and four or more wheel brakes. On actuation of the pedal, hydraulic pressure is transferred from the master cylinder to the cylinders in the four wheels. This applied the brakes in stopping the tractor. With or without a boost system, these key components are normally incorporated in the tractor. The trailer is provided with as few as two, but usually four or more, wheels. These wheels are also are provided with wheel located brake cylinders. For purposes of this disclosure, the trailer will be defined as incorporating its own hydraulic system. The hydraulic system connects from a master cylinder to the brake cylinders to actuate the brakes.

Brake systems have become relatively sophisticated over the last many years. They have been provided with duplicate master cylinders. They incorporate pressure sensors so that brake lights are appropriately illuminated. They also incorporate boost systems which reduce the amount of force required on the brake pedal. This enables lighter drivers, especially small women, to apply adequate force on the brake pedal to achieve proper stopping. A number of factors have intervened to make the hydraulic system for the brakes much more complicated. As a generalization, it is not desirable to intrude into the brake system of the tractor. By that, it is meant that the brake system is a matched set of components for the tractor. More specifically, when a trailer is added to the situation, it is desirable that there be no entry into, or penetration of, the brake system of the tractor or the trailer. The present disclosure is an accessory to be attached to and conveniently removed from the tractor. It is installed and removed without opening the hydraulic system or obtaining access to any component in the brake system of the tractor which is involved in stopping or starting. Likewise, it is desirable that the trailer brake system be left without penetration. In view of the fact that the trailer may be an automobile of small size for convenience at the destination, it is therefore desirable that the trailer brake system likewise not be invaded. Intrusion into the brake system is undesirable. To this end, the trailer is preferably operated in a fashion that permits simultaneous as well as balanced or synchronous tractor and trailer braking, which is activated when the driver brakes the tractor, and which does not require penetration of the brake system of the trailer.

The present disclosure is directed to a system which can be installed between tractor and trailer to thereby connect the two brake systems together so that they operate together. This enhances the braking power of the combination, and does not overload the brake system of the tractor. Typically, the braking capacity of the tractor is defined by the manufacturer based on the load in the tractor, but not the towed load. Assume as an easy example that the tractor weighs 4,000 pounds with passengers, fuel, etc. If the trailer also weighs 4,000 pounds, this can double the load that is required to be stopped. This can severely overload the braking system of the tractor. The present disclosure sets forth a mechanism by which the trailer brake system can be operated by the single driver and signals are transmitted to the brake system of the trailer for braking. This is done without penetration of the two separate hydraulic systems, and thereby avoids disruption of the components or other intrusion into either the tractor system or the trailer system.

In another aspect of the present disclosure, the trailer incorporates its own power system. On a long trip through repetitive braking actions, it is possible that brake light operation will run down the battery of the trailer. The present disclosure sets forth a trailer power boost system to assure that the trailer battery is not discharged unduly.

With the foregoing problems in view, this apparatus is summarized as a demountable system slaving the brake system of the trailer to the tractor which can be installed and removed without intrusion into the respective brake systems. The hydraulic equipment involved in the two brake systems is unaltered. It incorporates a position indicator which forms a voltage signal related to movement of the brake pedal in the tractor. Conveniently, an adjustable resistor with a fixed voltage applied to it will suffice. The signal is applied to comparator, and a feedback loop is established so that the trailer braking system can be actuated in a controlled fashion, and an adjustable resistor forms a signal connected to the comparator to thereby form a signal indicative of trailer brake system operation. Greater details will be given in the detailed description below.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a detailed schematic of the control system connected between the tractor and trailer; and FIG. 4 is an alternate pulse width control system connected between the tractor and the trailer.

DETAILED DESCRIPTION OF THE PREFERRED EMBODIMENT

Figure 1:
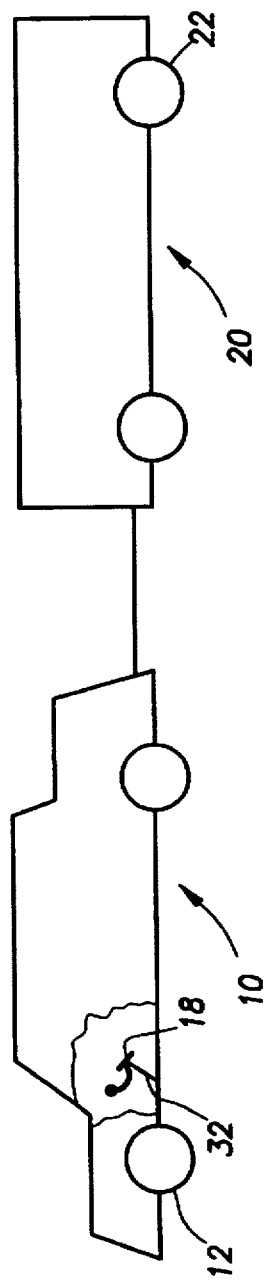
FIG. 1 is a side view showing a tractor and trailer wherein a portion of the tractor has been broken away to illustrate a brake pedal for driver actuation.
Figure 2:
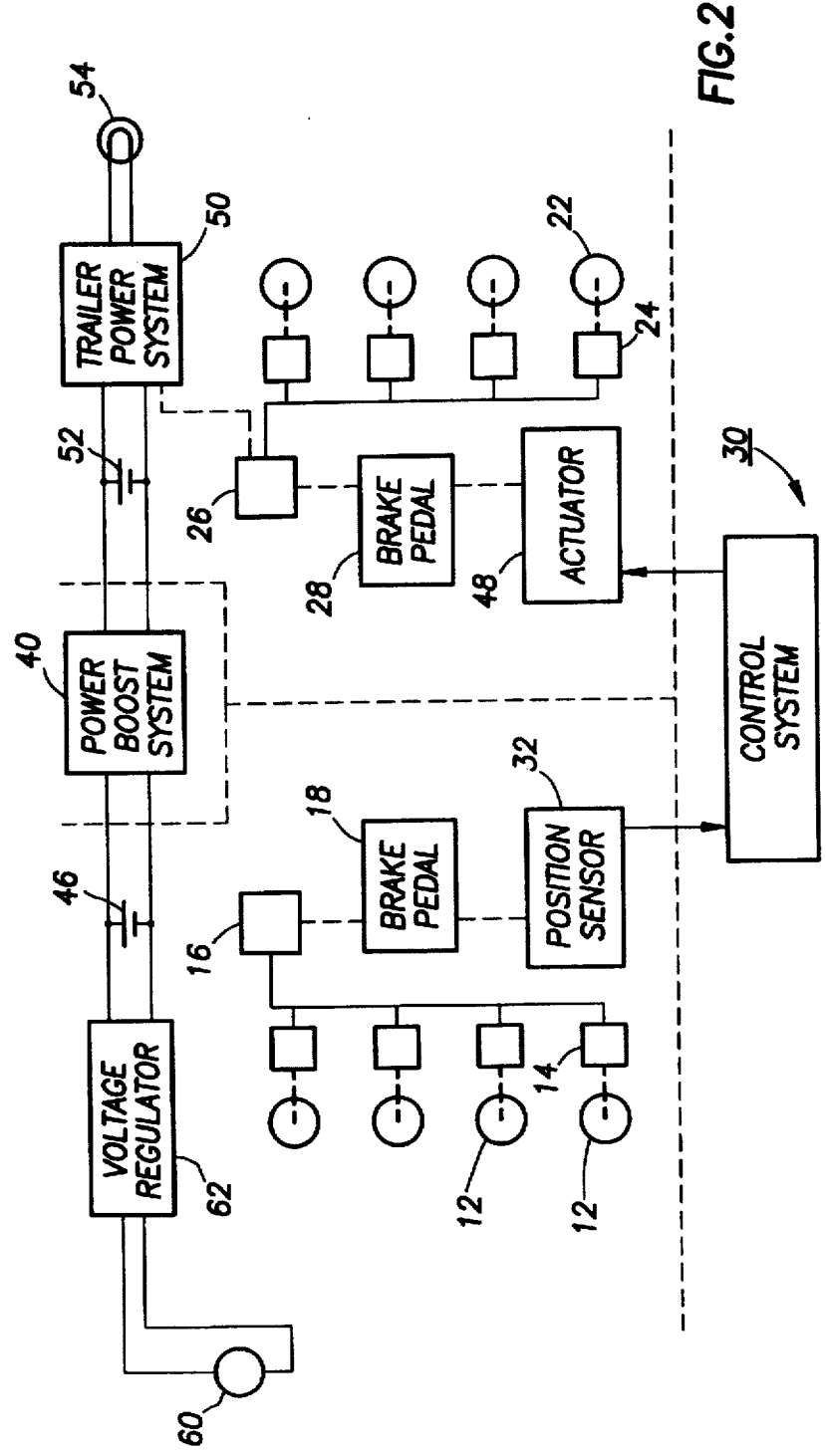
FIG. 2 is a schematic diagram showing the independent hydraulic brake systems of the tractor and trailer and further illustration implementation of the control system of the present disclosure along with a power boost system to slave the trailer to the tractor.

Attention is now directed to FIGS. 1 and 2 of the drawings where a tractor 10 is shown towing a trailer 20. The tractor 10 can be a conventional automobile, a utility vehicle, a pickup truck, an RV or other driver directed vehicle. The tractor 10 is not only provided with an engine for movement, but it is also provided with a number of wheels 12 which are uniquely provided with individual wheel brake cylinders 14 which make up part of the brake system. As shown in FIG. 2, there are a number of wheels, typically four or more, which support the vehicle 10. The invention can be utilized with a variety of brake systems, but it is preferable that the brake system of the tractor be hydraulic. For hydraulic systems, each wheel is preferably provided with its own wheel brake cylinder 14 and the several brake cylinders are connected with a master cylinder 16. The master cylinder 16 is operated by foot actuation applied to a brake pedal 18. FIG. 1 shows a portion of the tractor 10 broken away to show typical mounting of the brake pedal 18. It should be understood that the invention is not limited to hydraulic brake systems, but can also be adapted to other type of brake systems such as electrically actuated systems and mechanical systems which do not use hydraulic boosting.

The trailer 20 can be a simple cargo container which is a rectangular box or housing, or it can be a towed automobile, a compact trailer with living quarters or any other type of trailer mechanism. It is provided sometime with two but normally with four or more wheels 22. As for the tractor, the invention can be utilized with a variety of trailer brake systems, but it is preferred that the brake system of the trailer be hydraulic. A hydraulic trailer brake system is depicted in FIG. 2, where brake wheel cylinders 24 are actuated to operate the brakes of the trailer 20. The brake wheel cylinders 24 are powered by a master cylinder 26. The master cylinder 26 is operated by a brake pedal 28. Where the trailer is another automobile, the brake pedal 28 will be similar to the brake pedal 18 in the tractor. In some instances, the brake pedal 28 may be omitted but the master cylinder 26 is then operated either directly or indirectly by a preferably linear actuator 48. Whether the brake pedal is incorporated or actuator movement is applied directly to the master cylinder 26, it should be noted that the trailer brake system is completely independent of the brake system in the tractor 10. The two brake systems are totally independent and are left independent in a hydraulic sense. Functionally, however, one is operated in a slave fashion without invasion of the two respective hydraulic systems. Stated another way, when the brakes of the tractor are operated by the driver, the brakes of the trailer are synchronously operated insuring equal or balanced braking of both tractor and trailer. This involves the installation of the apparatus of the invention, including a control system 30, which has the form of an attachment placed on both tractor and trailer, and which can later be conveniently removed. It also incorporates a power boost system 40 to make electrical transfer as will be detailed.

In FIG. 1, the brake pedal 18 of the tractor 10 is suspended typically on a curving pedal mount which connects with the compartment wall or fire wall separating the passenger compartment from the engine compartment. That brake pedal incorporates a connection to the tractor master cylinder 16. It is preferably mounted for foot operation by the driver. For handicapped drivers, there may be a hand actuated brake lever that likewise will suffice for actuation of the brake system.

Still referring to FIG. 1, the brake pedal 18 is provided with a position sensor 32. The position sensor 32 responds to brake depression by forming a variable electrical signal. One example of this is shown in FIG. 3 of the drawings. In that view, an adjustable resistor is used as a position sensor 32 to sense movement of the brake pedal 18. This is shown in FIG. 3 where the resistor 32 is provided with an arm of a potentiometer which is moved to a specified location on the resistor. As the brake pedal 18 is depressed, the arm of the potentiometer is moved to provide a variable signal dependent on depression. By providing a particular $B^+$ voltage across the potentiometer, the output is a voltage which is proportional to brake pedal depression. While this voltage may have an offset, the offset can be readily measured and nulled. The position sensing potentiometer 32 is mounted so that brake pedal movement provides the variable output voltage. Moreover, the control system 30 of the present disclosure incorporates an amplifier 34 which amplifies the DC signal output resultant from brake pedal operation and provides it to a comparator 36. The comparator 36 is provided with two inputs and forms a comparative output signal on a conductor 40 as will be described.

As shown in FIG. 3, the comparator 36 is provided with a second input. This second input is derived from a trailer brake position sensor consisting of a potentiometer 38. Preferably, the potentiometer 38 senses the position of the pedal; if so equipped, of the brake system of trailer 20. It responds to brake pedal movement on the trailer. It is also provided with an output amplifier 42. The amplifiers 34 and 42 are relatively similar in construction and operation. They can both be provided with a controllable amplification factor and can be also provided with an adjustment to null both at a signal which is representative of a desired quiescent signal.

The actuator applying thrust to the brake pedal 28 or the master cylinder 26 on the trailer is the appropriate mounting place for the potentiometer 38 of the trailer brake sensor. The two adjustable resistors 32 and 38 serve as brake position sensors forming variable signals. They preferably are mounted in the same fashion assuming that the tractor and trailer have similar brake pedal construction. In the chance that the trailer has no brake pedal, there is nevertheless a master cylinder installed in the trailer 20, and the potentiometer 38 is installed to measure actuator extension as a braking force is applied to the trailer master cylinder 26. The control system 30 shown in FIG. 3 forms a difference signal from the comparator 36, and that signal is applied, by means of a conductor 40, to the actuator control circuit 44. In turn, that circuit delivers power from the tractor battery 46 to the actuator 48 in the trailer. The current applied to the preferably linear actuator 48 actuates the trailer master cylinder 26 to provide movement which is proportional to the current. This current is, in turn, proportional to the position of the tractor brake pedal 18 and related to the position of the trailer brake pedal 28. Balanced braking of both the tractor 10 and the trailer 20 is thereby obtained. The movement of the actuator 48 is conveyed either to the trailer brake pedal 28 or directly to the trailer master cylinder 26 for trailers having no brake pedal. Direct connection of the actuator 48 to operate the master cylinder 26 is an alternative within the scope of the present disclosure. With either embodiment, braking of the tractor effectively generates proportional braking of the trailer. That is, when the driver of the tractor applies pressure to the brake pedal 18, the braking system of the trailer is synchronously and proportionally operated thereby applying equal braking to both the tractor 10 and the trailer 20.

The actuator control circuit 44 preferably amplifies the signal input to it from the comparator 36 and controls the current flow delivered to the linear actuator 48. This typically is implemented by increasing the voltage across the actuator, which increases the current flow in view of the fact that the solenoid resistance is substantially fixed. As the voltage across the actuator is increased, the current is increased and the force applied to the trailer braking system is thereby increased. In that instance, proper and timely brake actuation is done.

It is helpful to describe adjustment of the various components to assure proper braking operation. In one aspect, there may be a scale difference between tractor and trailer output signals from the respective brake pedal position sensors. Going to FIG. 3, the voltages across the two position sensing potentiometers 32 and 38 may be the same but the deflection of the respective brake pedals may be different. This varies from make to make of tractor and trailer. The length of stroke on the brake pedals may be different so that the output voltage is different. This is accommodated by adjusting the amplification of the two output signals, and also by adjusting the null setting. There is a need to accommodate scale factors such as this at the time of installation of the equipment. There is also a need to adjust the stroke of the actuator 48. In some instances, the stroke may be excessive for the actuation of the brake system in the trailer. That is adjusted by changing the operation of the control system 30. Adjustments which provide trimming of the electrical signals and hence the actuator travel are believed to be well understood in the context of the present disclosure.

Another aspect of operation of the present device is the trailer power system. In FIG. 2 of the drawings, a mechanical linkage is indicated from the master cylinder 26 to the trailer power system 50. The trailer is typically provided with some sort of electrical power system. This integrated power system typically is a complete power system where the trailing vehicle is an automobile or some type of camper. It is provided with its own battery 52. The battery 52 connects with the trailer power system 50 to provide illumination from, as an example, a brake light 54. The brake light 54 is used to signal braking operations of the trailer. On a long trip, there will be a sufficient number of braking operations that the brake light 54 is illuminated hundreds of times, which may deplete the charge on the battery 52. The tractor incorporates a tractor located alternator 60 which is connected to a voltage regulator 62 and which provides electrical power for the battery in the tractor. This is the battery 46 which was previously introduced in FIG. 3. The present disclosure contemplates the connection of a power boost system 40 which connects from the electrical power system of the tractor to the trailer. This connection appropriately enables power to be transferred through the power boost system to the battery 52 in the trailer. While the brake light 54 is operated, the battery 52 is charged so that it is not depleted. Preferably, the power boost system comprises a voltage regulator which is adjusted to provide a charge to the battery 52 when the trailer battery becomes slightly depleted. This provides a continual transfer of power as required, but does not overcharge the battery 52.

In operation of the trailer electrical system, it is especially desirable that the trailer brake lights be slaved to the trailer brake system. That aspect of trailer construction is not altered; rather, it remains operative in the ordinary fashion.

FIG. 4 shows an alternate form of the control circuit 30 having pulse width modulation circuits 70 and 72 input to a comparator circuit 74. In this version, a comparison between two processions of pulses is made. The two pulse forming circuits 70 and 72 operate in accordance with a common mode. The preferred pulse system is a pulse width modulation procedure. By that, voltage change is indicated by a change in pulse length. The system again forms a comparison of the two inputs similar to that by the analog voltage arrangement shown in FIG. 3.

In FIGS. 3 and 4 both, the brake light signal is seen to the rear by observers. The driver (perhaps 100 feet forward in the front vehicle) is provided with a dash mounted lamp, 80 as a repeater to prove brake light operation.

It will be understood that certain combinations and subcombinations of the invention are of utility and may be employed without reference to other features in subcombinations. This is contemplated by and is within the scope of the present invention. As many possible embodiments may be made of this invention without departing from the spirit and scope thereof, it is to be understood that all matters herein above set forth or shown in the accompanying drawing are to be interpreted as illustrative and not in a limiting sense.

While the foregoing is directed to the preferred embodiment, the scope thereof is determined by the claims which follow:

What is claimed is:

1. A towed vehicle brake control system comprising:
   (a) a brake operation sensor cooperating with a braking system of a towing vehicle wherein said sensor does not penetrate the braking system of the towing vehicle, and wherein the output of said sensor is an electrical signal indicative of braking of said towing vehicle;
   (b) an electrically operated actuator for operating a braking system of said towed vehicle in response to said electrical signal applied thereto; and
   (c) a control circuit which cooperates with said brake operation sensor and said actuator to provide dynamic scaling of said electrical signal to equalize braking of said towing vehicle and said towed vehicle by using said output and a second electrical signal continuously indicative of said braking of said towed vehicle.

2. The system of claim 1 wherein said braking system of said towing vehicle is hydraulic, and wherein said towed vehicle brake control system does not hydraulically penetrate said towing vehicle braking system.

3. The system of claim 1 wherein said braking system of said towed vehicle is hydraulic, and wherein said towed vehicle brake control system does not hydraulically penetrate said towed vehicle braking system.

4. The system of claim 1 wherein said braking systems of said towing vehicle and said towed vehicle are hydraulic, and wherein said towed vehicle brake control system hydraulically controls said towing vehicle braking system at the foot pedal thereof and said towed vehicle.

5. The system of claim 1 wherein said towed vehicle brake control system is constructed and arranged to respond to braking of said towing vehicle to operate a master cylinder of said towed vehicle.

6. A system for synchronously operating the hydraulic brake system of a towed trailer by operating the hydraulic brake system of a towing tractor, comprising:
  (a) a tractor brake sensor which senses the operation of said tractor brake system without penetrating the hydraulics of said tractor brake system, wherein the output of said tractor brake sensor is a first electrical signal indicative of the operation of said tractor brake system;
  (b) a trailer brake sensor which senses the operation of said trailer brake system without penetrating the hydraulics of said trailer brake system, wherein the output of said trailer brake sensor is a second electrical signal;
  (c) a control circuit which utilizes said first signal and said second signal to generate a third electrical signal; and
  (d) an electrically operated actuator for operating a master cylinder element of said trailer brake system in response to said third electrical signal applied thereto, wherein said third electrical signal is used to control said actuator such that the braking of said trailer is equalized with the braking of said tractor.

7. The system of claim 6 wherein said tractor brake sensor senses the operation of said tractor brake system by sensing the position of a tractor brake system during operation.

8. The system of claim 6 wherein said trailer brake sensor senses the operation of said trailer brake system by sensing the operative condition of the brake system of said trailer.

9. The system of claim 6 wherein said control circuit comprises:
  (a) a comparator into which said first electrical signal and said second electrical signal are input to form a fourth electrical signal; and
  (b) an actuator control circuit which cooperates with said comparator and said actuator, wherein said actuator control circuit receives said fourth electrical signal, and outputs said third electrical signal, and wherein said third electrical signal comprises power from a battery in said tractor of magnitude proportional to the magnitude of said fourth electrical signal.

10. The system of claim 9 wherein said first electrical signal and said second electrical signal and said fourth electrical signal comprise analog voltages.

11. The system of claim 9 wherein said first electrical signal and said second electrical signal comprise two processions of pulses.

12. The system of claim 6 further comprising a power boost system, wherein said power boost system:
  (a) connects power from a power source in said tractor to a power source in said trailer; and
  (b) transfers power from said power source in said tractor to said power source in said trailer thereby allowing trailer brake indicators to be operated without depleting said trailer power source.

13. A method for controlling the braking of a towed vehicle comprising:
  (a) using a brake operation sensor cooperating with a braking system of a towing vehicle to generate an electrical signal indicative of braking of said towing vehicle, wherein said sensor does not penetrate the braking system of the towing vehicle;
  (b) operating, with an electrically operated actuator, a braking system of said towed vehicle in response to said electrical signal applied to said actuator; and
  (c) providing a control circuit which cooperates with said brake operation sensor and said actuator to provide dynamic scaling of said electrical signal to equalize braking of said towing vehicle and said towed vehicle by using said output and a second electrical signal continuously indicative of said braking of said towed vehicle.

14. The method of claim 13 wherein said braking system of said towing vehicle is hydraulic, and wherein said method for controlling the braking of a towed vehicle does not hydraulically penetrate said towing vehicle braking system.

15. The method of claim 13 wherein said braking system of said towed vehicle is hydraulic, and wherein said method for controlling the braking of a towed vehicle does not hydraulically penetrate said towed vehicle braking system.

16. The method of claim 13 wherein said braking systems of said towing vehicle and said towed vehicle are hydraulic, and wherein said method for controlling the braking of a towed vehicle does not hydraulically penetrate said towing vehicle braking system and said towed vehicle.

17. The method of claim 13 wherein said method for controlling the braking of a towed vehicle utilizes apparatus which is conveniently attached and removed from said towing vehicle and said towed vehicle.

18. A method for synchronously operating a hydraulic brake system of a towed trailer by operating a hydraulic brake system of a towing tractor, comprising:
  (a) sensing the operation of said tractor brake system with a tractor brake position sensor without penetrating the hydraulics of said tractor brake system, wherein the output of said tractor brake position sensor is a first electrical signal indicative of the operation of said tractor brake system;
  (b) sensing the operation of said trailer brake system with a trailer brake position sensor without penetrating the hydraulics of said trailer brake system, wherein the output of said trailer brake position sensor is a second electrical signal;
  (c) using said first signal and said second signal to generate a third electrical signal; and
  (d) operating a master cylinder element of said trailer brake system, with an electrically operated actuator, in response to said third electrical signal applied thereto, wherein said third electrical signal is used to control said actuator such that the braking of said trailer is equalized with the braking of said tractor.

19. The method of claim 18 wherein said tractor brake position sensor senses the operation of said tractor brake system by sensing the position of a tractor brake pedal.

20. The method of claim 18 wherein said trailer brake system forms a brake signal during braking, and also forms a brake signal for the towing tractor operator.

21. The method of claim 18 wherein:
  (a) said first electrical signal and said second electrical signal are compared to form a fourth electrical signal; and wherein
  (b) an actuator control circuit receives said fourth electrical signal, and outputs said third electrical signal; and wherein (c) said third electrical signal comprises power from a battery on said tractor of magnitude proportional to the magnitude of said fourth electrical signal.

22. The method of claim 21 wherein said first electrical signal and said second electrical signal and said fourth electrical signal comprise analog voltages.

23. The method of claim 21 wherein said first electrical signal and said second electrical signal comprise two processions of pulses.

24. The method of claim 18 further comprising:
(a) transferring power from a power source in said tractor to a power source in said trailer;
(b) using said transferred power to illuminate a trailer brake indicator without depleting said trailer power source.

25. A system for synchronously operating the hydraulic brake system of a towed trailer by operating the hydraulic brake system of a towing tractor, comprising:
(a) a tractor brake sensor which senses the operation of said tractor brake system, wherein the output of said tractor brake sensor is a first electrical signal indicative of the operation of said tractor brake system;
(b) a trailer brake sensor which senses the operation of said trailer brake system, wherein the output of said trailer brake sensor is a second electrical signal;
(c) a control circuit which utilizes said first signal and said second signal to generate a third electrical signal; and
(d) an actuator for operating a master cylinder element of said trailer brake system in response to said third electrical signal applied thereto,
  (i) wherein said third electrical signal is used to control said actuator such that the braking of said trailer is equalized with the braking of said tractor, and
  (ii) wherein said actuator operates said master cylinder element of said trailer brake system by controlling the position of a brake pedal which cooperates with said master cylinder element of said trailer brake system.

26. A method for synchronously operating a hydraulic brake system of a towed trailer by operating a hydraulic brake system of a towing tractor, comprising:
(a) sensing the operation of said tractor brake system with a tractor brake position sensor, wherein the output of said tractor brake position sensor is a first electrical signal indicative of the operation of said tractor brake system;
(b) sensing the operation of said trailer brake system with a trailer brake position sensor, wherein the output of said trailer brake position sensor is a second electrical signal;
(c) using said first signal and said second signal to generate a third electrical signal; and
(d) operating a master cylinder element of said trailer brake system, with an actuator, in response to said third electrical signal applied thereto,
  (i) wherein said third electrical signal is used to control said actuator such that the braking of said trailer is equalized with the braking of said tractor, and
  (ii) wherein said trailer brake position sensor senses the operation of said trailer brake system by sensing the position of a brake pedal within said trailer.

27. A method for synchronously operating a hydraulic brake system of a towed trailer by operating a hydraulic brake system of a towing tractor, comprising:
(a) sensing the operation of said tractor brake system with a tractor brake position sensor, wherein the output of said tractor brake position sensor is a first electrical signal indicative of the operation of said tractor brake system;
(b) sensing the operation of said trailer brake system with a trailer brake position sensor, wherein the output of said trailer brake position sensor is a second electrical signal;
(c) using said first signal and said second signal to generate a third electrical signal; and
(d) operating a master cylinder element of said trailer brake system, with an actuator, in response to said third electrical signal applied thereto,
  (i) wherein said third electrical signal is used to control said actuator such that the braking of said trailer is equalized with the braking of said tractor, and
  (ii) wherein said actuator operates said master cylinder element of said trailer brake system by controlling the position of a brake pedal which cooperates with said master cylinder element of said trailer brake system.

* * * * *